United States Patent [19]

Komazaki

[11] Patent Number: 5,724,326
[45] Date of Patent: Mar. 3, 1998

[54] APPARATUS FOR GENERATING TRACK COUNT PULSE

[75] Inventor: Takahiro Komazaki, Kanagawa, Japan

[73] Assignee: Sony Corporation, Tokyo, Japan

[21] Appl. No.: 701,507

[22] Filed: Aug. 22, 1996

[30] Foreign Application Priority Data

Aug. 25, 1995 [JP] Japan .................................. 7-217923

[51] Int. Cl.$^6$ ...................................................... G11B 7/09
[52] U.S. Cl. ..................................... 369/44.29; 369/44.28
[58] Field of Search ............................ 369/44.29, 443.35, 369/44.27, 44.28, 44.26, 44.25, 124

[56] References Cited

U.S. PATENT DOCUMENTS 5,065,383 11/1991 Tateishi et al. ....................... 369/44.28
5,416,758 5/1995 Ito ........................................ 369/44.28
5,561,643 10/1996 Yamazaki et al. .................... 369/44.29
5,592,448 1/1997 Suzuki et al. ........................ 369/44.29

FOREIGN PATENT DOCUMENTS 0 401 973 A2 12/1990 European Pat. Off. .

Primary Examiner—Thang V. Tran
Attorney, Agent, or Firm—William S. Frommer; Alvin Sinderbrand

[57] ABSTRACT

A track count pulse generating apparatus is provided which can correctly generate track count pulses to accurately count the number of tracks on a variety of optical disks having track pitches different from each other.

17 Claims, 4 Drawing Sheets

TRACK COUNT PULSE GENERATING APPARATUS
ACCORDING TO THE PRESENT INVENTION

TRACK COUNT PULSE GENERATING APPARATUS ACCORDING TO THE PRESENT INVENTION

TRACKING ERROR SIGNAL WAVEFORM

CONVENTIONAL TRACK COUNT
PULSE GENERATING APPARATUS

APPARATUS FOR GENERATING TRACK COUNT PULSE

BACKGROUND OF THE INVENTION

The present invention relates to an apparatus for generating track count pulses from different optical disks having different track pitches, and more particularly, to an apparatus for use in recording and/or reproducing data on an optical disk, a magneto optical disk, or a phase-changing-type optical disk (hereinafter collectively referred to as an "optical disk").

FIG. 4 is a block diagram illustrating one example of a track count pulse generating apparatus 200 for use in a multi-disk player adapted to record and/or reproduce data from a plurality of optical disks having different recording formats, e.g., a video optical disk or an audio optical disk. As illustrated, the apparatus is comprised of an optical pickup 202, a low-pass filter circuit 204, a judging circuit 205, and a pulse generator circuit 206.

The optical pickup 202 is provided with a light source (not shown) for irradiating a light beam such as a laser beam or the like on a disk medium 201 (i.e., video or audio optical disk) and an objective lens (not shown) for converging a light beam reflected from the disk medium 201. A signal generated from the reflected light beam is supplied to a matrix circuit 203, which produces a tracking error signal therefrom and supplies the tracking error signal to the low-pass filter 204. The low-pass filter 204 reduces noise superimposed on the tracking error signal and supplies a filtered tracking error signal to the judging circuit 205. The judging circuit 205 determines whether the light beam irradiated on the disk medium 201 intersects any tracks formed thereon as a function of the amplitude of the tracking error signal. The pulse generating circuit 206 generates a track count pulse in response to the determination made by the judging circuit 205.

When an access operation is performed on the disk medium placed in the multi-disk player, the track count pulse generating apparatus 200 uses the tracking error signal to determine the number of tracks on the disk medium 201 and thereby estimate the amount of data to be read from the disk medium 201. Since conventional audio and video optical disks have the same track pitch, i.e., 1.6 μm, the matrix circuit 203 can generate tracking error signals with the same frequency for both audio and video optical disks. Accordingly, the track count pulse generating apparatus of FIG. 4 having only one low-pass filter 204, adapted for an optical medium having the track pitch of 1.6 μm, can sufficiently process the tracking error signals of both audio and video optical disks.

However, the multi-disk player incorporating the apparatus of FIG. 4 cannot obtain an accurate tracking error signal for an optical medium unless the low-pass filter 204 is adapted to the track pitch of this optical medium. Consequently, when the low-pass filter 204 is adapted for conventional audio and video optical disks, the apparatus of FIG. 4 cannot obtain accurate tracking error signal from a digital video disk having a track pitch of, for example, 0.85 μm. The track pitch of the digital video disk is approximately one-half that of the conventional video or audio disk. The smaller track pitch leads to a tracking error signal which has a broader frequency range. Similarly, the low-pass filter adapted for use with digital video disk cannot be used to accurately count the number of tracks on the conventional audio and video optical disks because the frequency range of the low pass filter is too broad to reduce the noise superimposed on the tracking error signal.

Thus, the track count pulse generating apparatus of FIG. 4 having only one low-pass filter cannot accurately count the tracks of optical media having different track pitches.

OBJECTS OF THE INVENTION

Therefore, it is an object of the present invention to provide an apparatus which overcomes the shortcomings of the above-discussed apparatus.

Another object of the present invention is to provide an apparatus which selects from a plurality of low-pass filters a low-pass filter having a frequency range corresponding (or matched) to the track pitch of an optical disk being accessed.

Various other objects, advantages and features of the present invention will become readily apparent from the ensuing detailed description, and the novel features will be particularly pointed out in the appended claims.

SUMMARY OF THE INVENTION

In accordance with this invention, the apparatus correctly generates a track count pulse signal for different optical media having different track pitches. A laser beam impinges on an arbitrary optical medium placed in a multi-disk player. A tracking error signal is generated from the reflection of the laser beam and a high frequency component, i.e., noise, is filtered from the tracking error signal using a low-pass filter. A number of low pass filters having different frequency ranges are provided, and the low-pass filter whose frequency range corresponds to the track pitch of the optical medium is selected. The apparatus determines the amplitude levels of the filtered tracking error signal and generates a track count pulse as a function of such amplitude level, for example, when the amplitude level crosses zero.

In accordance with an aspect of this invention, the apparatus initially selects one low-pass filter and counts the track count pulses derived from that low-pass filter. If the track count number derived from the low pass filter is within a predetermined range specified for that low-pass filter, the selected filter is correct. But, if the track count number is outside that range, it is assumed a different low pass filter should be selected; and the tracking error signal is supplied to a different low pass filter to generate therefrom the track count pulse.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE PREFERRED EMBODIMENTS

As previously discussed, the track count pulse apparatus incorporated in a multi-disk player must be capable of correctly counting tracks from various different optical disk media having different track pitches. An embodiment of the present invention will now be described hereinbelow with reference to the drawings.

Figure 1:
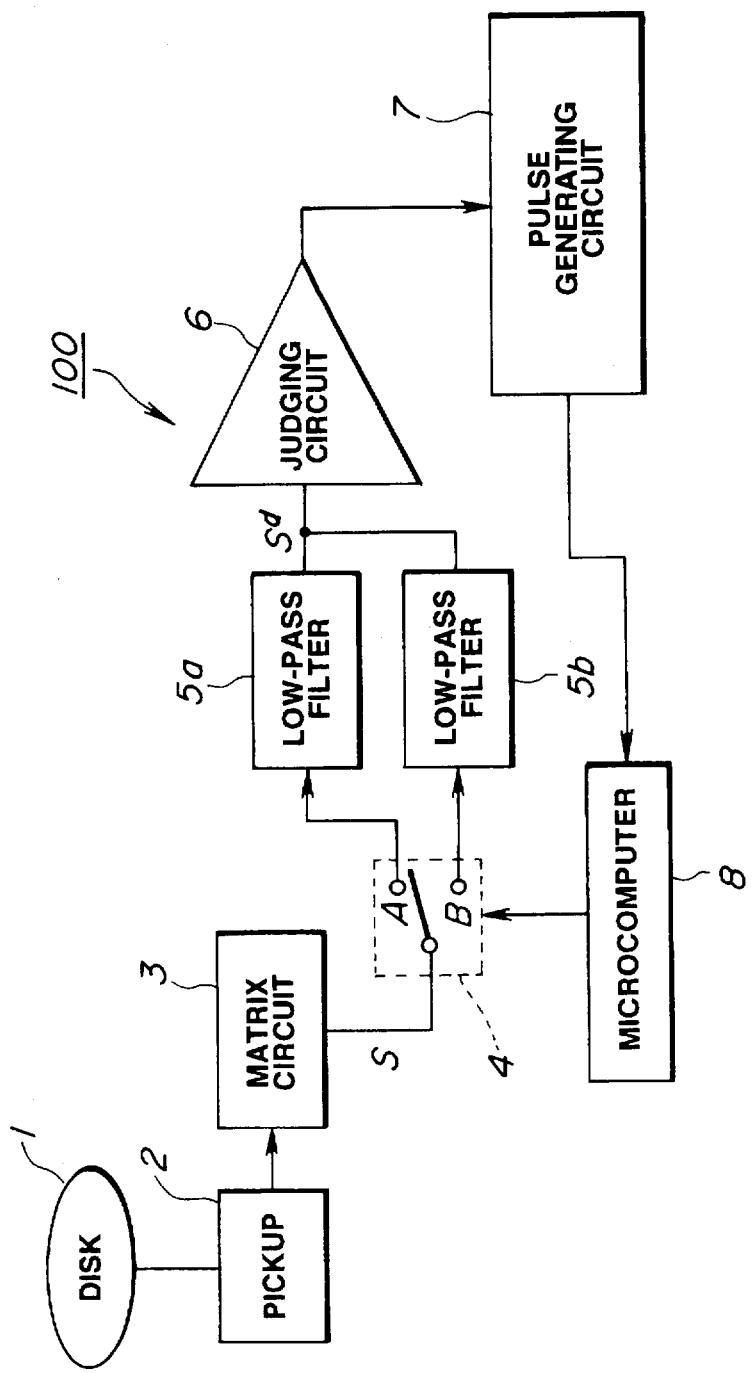
FIG. 1 is a block diagram illustrating an embodiment of a track-count-pulse generating apparatus of the present invention.

Turning now to FIG. 1, there is illustrated a block diagram of apparatus for counting the number of tracks read from different optical recording media having different track pitches. The apparatus is comprised of an optical pickup 2, a matrix circuit 3, a switch 4, low pass-filters 5a and 5b, a judging circuit 6, a pulse generating circuit 7, and a microcomputer 8.

The optical pickup 2 is provided with a light source (not shown) for irradiating a light beam such as a laser beam or the like onto a disk medium 1 (i.e., video or audio or digital video optical disk) and an objective lens (not shown) for converging a light beam reflected from the disk medium 1. A signal generated from the reflected light beam is supplied to a matrix circuit 3 which produces a tracking error signal therefrom and supplies the tracking error signal to the switch 4. The switch 4 directs the tracking error signal outputted from the matrix circuit 3 to either low-pass filter 5a or low-pass filter 5b in response to the microcomputer 8. The microcomputer 8 also controls the overall operation of the track count pulse generating apparatus of FIG. 1. The low-pass filters 5a and 5b reduce noise superimposed on the tracking error signal and supply a filtered tracking error signal to the judging circuit 6. The judging circuit 6 determines whether the light beam irradiated on the disk medium 1 intersects any tracks formed thereon as a function of the amplitude of the tracking error signal. The pulse generating circuit 7 generates a track count pulse in response to the determination made by the judging circuit 6.

Figure 4:
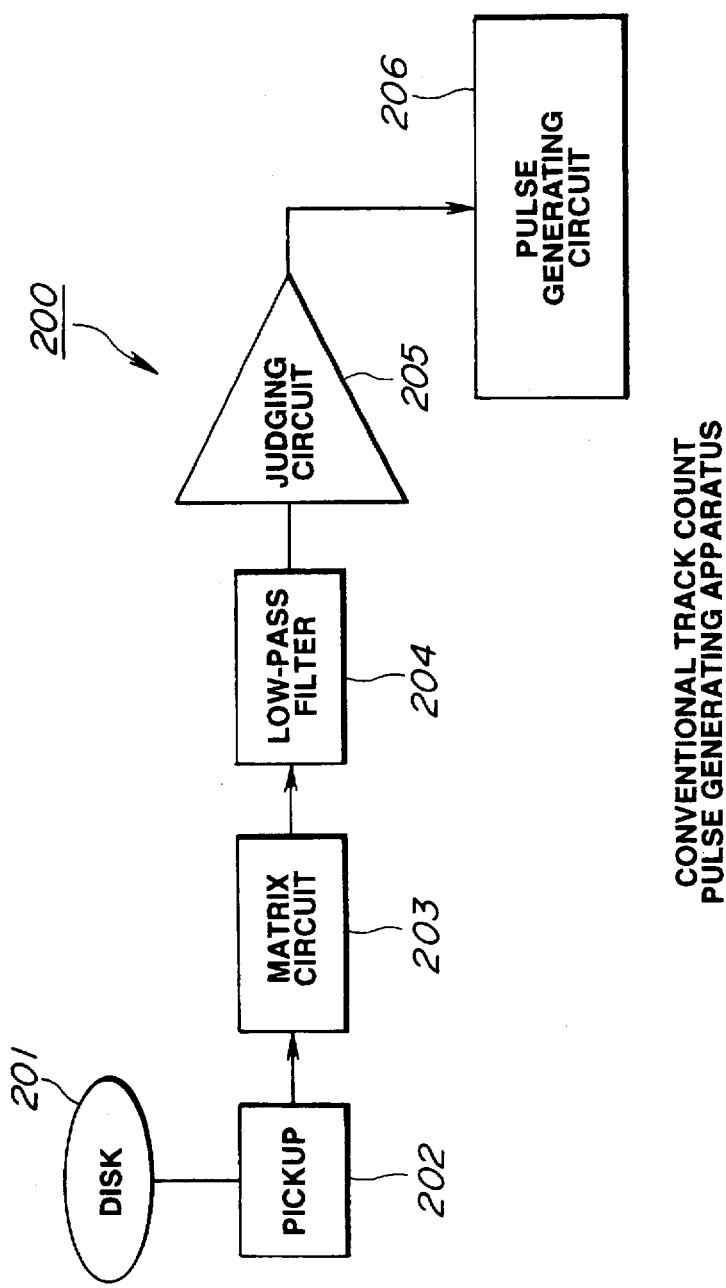
FIG. 4 is a block diagram illustrating another embodiment of track-count-pulse generating apparatus.

Unlike the aforementioned track count pulse generating apparatus of FIG. 4, the embodiment of FIG. 1 can accurately count tracks of optical disks having different track pitches. Hence, it is possible to employ two different types of optical disks, e.g., conventional optical disks having a track pitch of 1.6 µm and digital video disks having a track pitch of 0.85 µm, in the multi-disk player incorporating the track count pulse generating apparatus of FIG. 1.

A spindle motor (not shown) rotates the disk medium 1 at a predetermined constant speed. The optical pickup 2 collects the light beam emitted from a semiconductor laser or like and irradiates the collected light beam onto a target position (laser spot) on the disk medium 1, and then converges the light beam reflected from the disk medium 1. The optical pickup 2 is transported to a position near the target position of the disk medium 1 at high speed by a motor (not shown) before the light beam irradiates the disk medium 1. The optical pickup 2 generates a signal from the reflected light beam and that signal is supplied to the matrix circuit 3.

Figure 2:
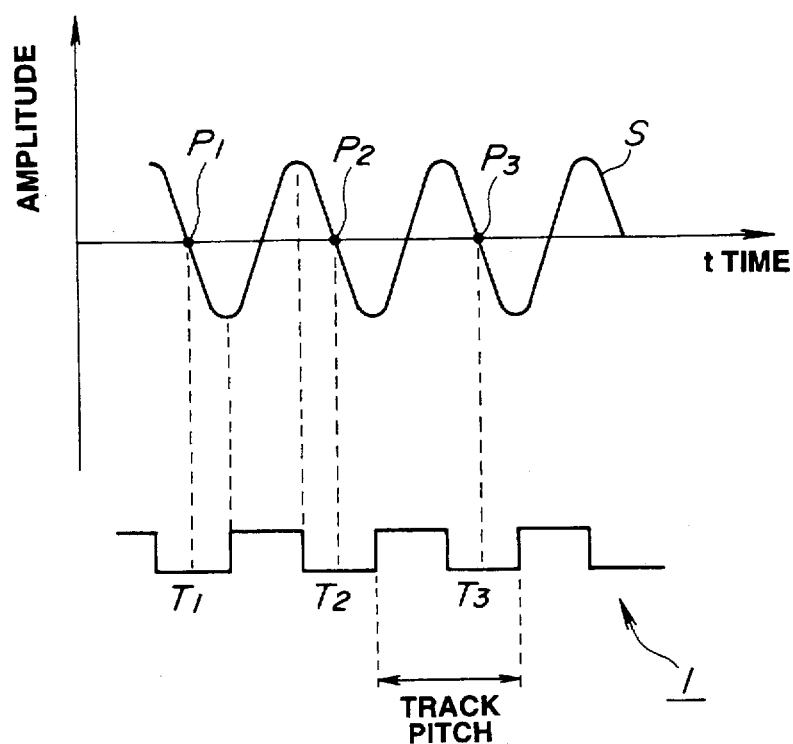
FIG. 2 is a diagram for illustrating the relationship between a tracking error signal and a track of a disk medium.

The matrix circuit 3 produces a tracking error signal in response to the reflected light beam. For example, when the optical pickup 2 crosses the tracks of the disk medium 1, the tracking error signal S of FIG. 2 is produced. The zero crossing points $P_1, P_2, P_3, \ldots$ of the tracking error signal S of FIG. 2 represent amplitudes of the tracking error signal S when the laser beam is centered on tracks $T_1, T_2, T_3, \ldots$, of the disk medium 1. Accordingly, since the number of tracks on the disk medium 1 corresponds to the number of zero crossings of the tracking error signal S, the number of tracks on the disk medium 1 can be determined by the judging circuit 6 (discussed hereinbelow), which compares the tracking error signal to a reference level. That is, the number of pulses in the pulse signal generated by the pulse generating circuit 7 (discussed hereinbelow) corresponds to the number of times the judging circuit 6 determines that the tracking error signal has intersected the reference level, i.e., the number of times that the amplitude level of the tracking error signal crosses the reference level. The number of tracks on the disk medium 1 can be determined by counting the number of pulses in the pulse signal.

Figure 3:
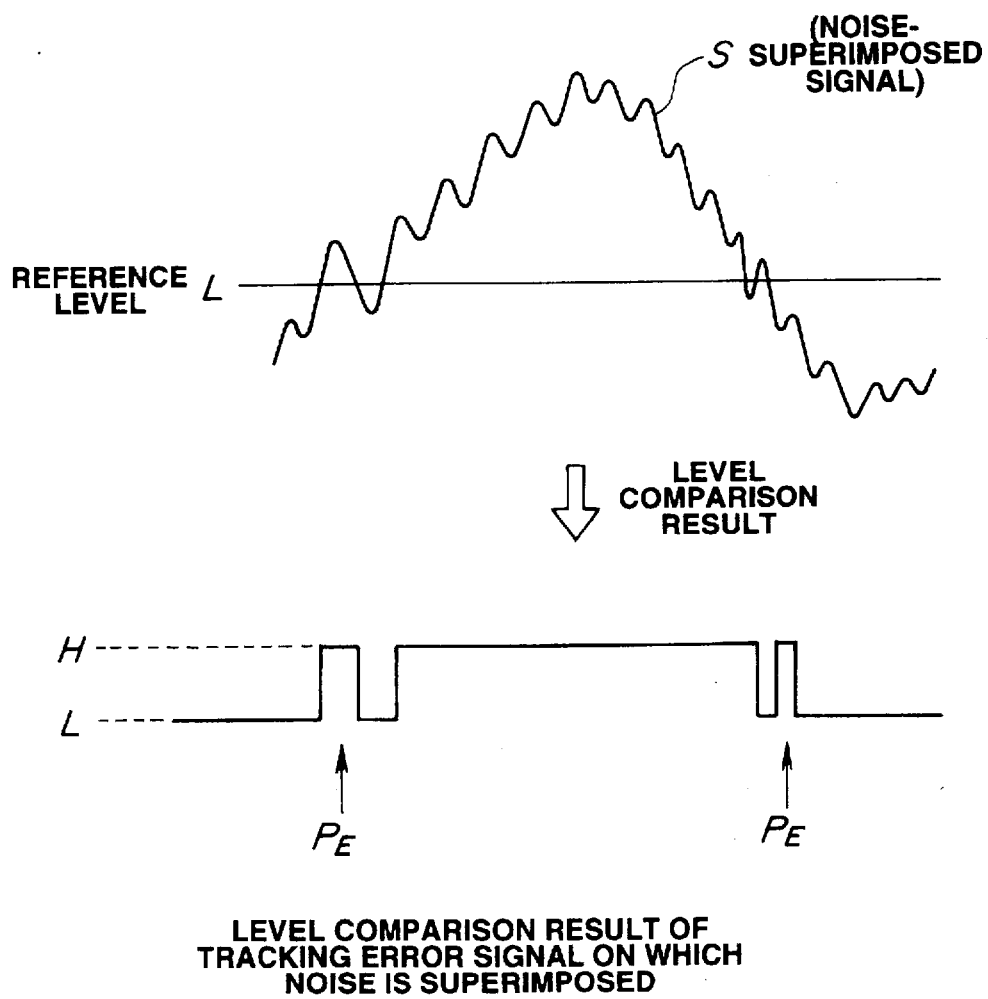
FIG. 3 is a diagram to which reference will be made in describing the erroneous operation induced when noise is superimposed on the tracking error signal.

However, when noise is superimposed on the tracking error signal, as shown in FIG. 3, the track count pulse generating apparatus may erroneously determine the number of tracks on the recording medium. The signals recorded on the tracks may appear to "leak" causing modulation noise and like. The ragged edges of the tracking error signal S in FIG. 3 result from noise superimposed thereon which is at a higher frequency than the tracking error signal S. When such tracking error signal S of FIG. 3 containing noise is directly supplied to the judging circuit 6, an erroneous operation is introduced to the judging circuit. That is, the judging circuit 6 erroneously determines the number of zero crossings of the tracking error signal and thereby erroneously counts the number of tracks on the disk medium. The judging circuit 6 compares the tracking error signal of FIG. 3 containing noise to the reference level L (here, the reference level is the zero level) and outputs a digitized pulse signal as a result of the comparison. The resulting digitized pulse signal depicted in FIG. 3 shows two pulses identified as $P_E$ which have been erroneously generated as the result of the noise superimposed on the tracking error signal S. Consequently, the pulse generating apparatus erroneously determines that the pulse $P_E$ represents a track on the disk medium.

It is appreciated, therefore, that the tracking error signal should be filtered using low-pass filters to reduce the noise superimposed thereon before the tracking error signal is supplied to the judging circuit 6. Generally, a low-pass filter has a single transmission band extending from zero to some cutoff frequency. The cutoff frequency is selected to eliminate noise which is at a higher frequency than the tracking error signal. In accordance with the present invention, the track count pulse generating apparatus of FIG. 1 includes two types of low-pass filters 5a and 5b disposed before the judging circuit 6. These two low-pass filters 5a and 5b are adapted for use with two types of optical disks having different track pitches, e.g., an audio disk having a track pitch of 1.6 µm and a digital video disk having a track pitch of 0.85 µm. For example, the low-pass filter 5a is adapted to filter, or pass, the frequency range of the tracking error signal of the audio disk and the low-pass filter 5b is adapted to filter, or pass, the frequency range of the tracking error signal of the digital video disk.

Returning to FIG. 1, the tracking error signal from the matrix circuit 3 is supplied to whichever low-pass filter is connected thereto by the switch 4. It will appreciated that the tracking error signal may be supplied to an arbitrarily selected low-pass filter or to a designated filter (i.e., a default filter) regardless of the present switch position. Advantageously, the matrix circuit 3 includes a memory for storing the tracking error signal for a purpose soon to become apparent.

For example, if the switch 4 presently is in state A, then the tracking error signal is supplied to the low-pass filter 5a. The low-pass filter 5a reduces the noise contained in the tracking error signal and supplies the filtered tracking error signal $S^d$ to the judging circuit 6.

The judging circuit 6 may comprise a comparator or a servo integrated circuit (IC) which comprises a comparator. The judging circuit compares the filtered tracking error signal $S^d$ derived from the low-pass filter 5a to the reference level L (FIG. 3) and the result of the comparison is supplied to the pulse generating circuit 7.

The pulse generating circuit generates a track count pulse in response to the determination made by the judging circuit 6 and supplies the track count pulse to the microcomputer 8. If the low-pass filter 5a is adapted to process the frequency range of the tracking error signal of the audio disk, then the microcomputer 8 determines if the track count (number of tracks on the disk medium 1) as determined from the filtered tracking error signal is within a predetermined range which corresponds to the audio disk. If the track count is within this range then the disk medium 1 set on the multi-disk player 100 is assumed to have a track pitch of 1.6 µm, i.e., the disk is a conventional audio or video disk. However, if the track count is not within the specified range then the disk medium 1 is assumed to have a track pitch of 0.85 µm and the microcomputer operates the switch 4 to state B so that the matrix circuit 3 now is connected to the low-pass filter 5b via the switch.

The tracking error signal which was previously supplied to the low-pass filter 5a from the matrix circuit 3 now is supplied to the low-pass filter 5b. That is, the tracking error signal stored in the memory of the matrix circuit is supplied to the low-pass filter 5b. The low-pass filter 5b reduces the noise contained in the tracking error signal and supplies the filtered tracking error signal $S^d$ to the judging circuit 6.

The judging circuit 6 compares the filtered tracking error signal $S^d$ derived from the low-pass filter 5b to the reference level L (FIG. 3) and the result of this comparison is supplied to the pulse generating circuit 7. The pulse generating circuit generates a track count pulse in response to the determination made by the judging circuit and supplies the track count pulse to the microcomputer 8.

The foregoing has assumed that low-pass filter 5a is adapted to filter the tracking error signal whose frequency range is generated from the audio or video disk. It is appreciated, however, that if the low-pass filter 5a is adapted to process the frequency range of the tracking error signal of the digital video disk, then the microcomputer 8 determines if the track count derived from the tracking error signal filtered by low-pass filter 5a is within the predetermined range specified for the digital video disk.

Accordingly, noise contained in the tracking error signal can be reduced under optimum conditions with respect to the two types of optical disks whose track pitches differ greatly from each other, namely the audio disk whose track pitch is 1.6 µm and the digital video disk whose track pitch is 0.85 µm. Hence, the level comparison of the tracking error signal can be correctly performed to correctly count the number of tracks on the disk medium.

While the present invention has been particularly shown and described with reference to a preferred embodiment, it will be readily appreciated that various changes may be made without departing from the spirit and scope of the invention. For example, the number of low-pass filters is not limited to two and can be any practical number greater than two. Also, the track count pulse generating apparatus 100 may be adapted to handle all types of optical disks such as optical disks and magneto optical disks, and also may be incorporated into reproducing and recording/reproducing apparatuses.

It is appreciated that the determination of the track pitch of the disk medium 1 to select the appropriate low-pass filter need not be performed by the microcomputer 8, but, rather, may be externally and manually switched using an external device. Hence, the microcomputer may control the switch 4 based on information externally supplied.

What is claimed:

1. Apparatus for generating a track count pulse from different optical media having respectively different track pitches, wherein each said track count pulse signal represents a track on a respective optical medium, comprising:

means for impinging a light beam on said respective optical medium;
   means for receiving said light beam reflected from said respective optical medium;
   means for generating a tracking error signal from the reflected light beam;
   a plurality of low-pass filters each having a respective filter frequency range corresponding to the track pitch of a respective one of said plurality of optical media;
   means for selecting one of said low-pass filters for filtering said tracking error signal;
   means for determining an amplitude level of the filtered tracking error signal; and
   means for generating a track count pulse as a function of the amplitude level of said filtered tracking error signal.

2. The apparatus of claim 1, wherein said means for determining includes comparing means for comparing the amplitude level of said filtered error signal to a predetermined reference level; and wherein said means for generating a track count pulse is operable to generate said track count pulse when said amplitude level of said filtered tracking error signal crosses said predetermined reference level.

3. The apparatus of claim 1, wherein said means for selecting is a microcomputer.

4. The apparatus of claim 1, wherein said means for selecting includes means for arbitrarily selecting one of said low-pass filters; means for counting the number of generated track count pulses derived from said filtered tracking error signal to represent the number of tracks on said respective optical medium; means for determining whether said number of tracks is within a predetermined range specified for the selected low-pass filter; and means for operating said means for selecting to select another low-pass filter if it is determined that said number of tracks is not within said predetermined range.

5. The apparatus of claim 1, wherein said plurality of low-pass filters is two low-pass filters.

6. The apparatus of claim 5, wherein said means for selecting includes means for initially selecting a first of said two low-pass filters; means for counting the number of generated track count pulses derived from said filtered tracking error signal to represent the number of tracks on said respective optical medium; means for determining whether said number of tracks is within a predetermined range specified for said first low-pass filter; and means for operating said means for selecting to select the other low-pass filter if it is determined that said number of tracks is not within said predetermined range.

7. The apparatus of claim 1, wherein said optical medium is an audio disk.

8. The apparatus of claim 1, wherein said optical medium is a video disk.

9. The apparatus of claim 1, wherein said optical medium is a digital video disk.

10. A method of generating a track count pulse signal from different optical media having respectively different track pitches, wherein each said track count pulse represents a track on a respective optical medium, comprising the steps of:

impinging a light beam on said respective optical medium;

receiving said light beam reflected from said respective optical medium;

generating a tracking error signal from the reflected light beam;

selecting one of a plurality of low-pass filters having respectively different filter frequency ranges corresponding to the track pitches of said respective optical media to filter said tracking error signal by the selected low-pass filter;

determining an amplitude level of the filtered tracking error signal; and generating a track count pulse as a function of the amplitude level of said filtered tracking error signal.

11. The method of claim 10, wherein the step of determining includes comparing the amplitude level of said filtered error signal to a predetermined reference level; and wherein the step of generating a track count pulse includes generating said track count pulse when said amplitude level of said filtered tracking error signal crosses said predetermined reference level.

12. The apparatus of claim 10, wherein the step of selecting includes arbitrarily selecting one of said low-pass filters; counting the number of generated track count pulses derived from said filtered tracking error signal to represent the number of tracks on said respective optical medium; determining whether said number of tracks is within a predetermined range specified for the selected low-pass filter; and selecting another low-pass filter if it is determined that said number of tracks is not within said predetermined range.

13. The method of claim 10, wherein said plurality of low-pass filters is two low-pass filters.

14. The method of claim 13, wherein the step of selecting includes initially selecting a first of said two low-pass filters; counting the number of generated track count pulses derived from said filtered tracking error signal to represent the number of tracks on said respective optical medium; determining whether said number of tracks is within a predetermined range specified for said first low-pass filter; and selecting the other low-pass filter if it is determined that said number of tracks is not within said predetermined range.

15. The method of claim 10, wherein said optical medium is an audio disk.

16. The method of claim 10, wherein said optical medium is a video disk.

17. The method of claim 10, wherein said optical medium is a digital video disk.

* * * * *